(12) United States Patent
Chen et al.

(10) Patent No.: US 8,558,982 B2
(45) Date of Patent: Oct. 15, 2013

(54) LIQUID CRYSTAL DISPLAY PANEL AND MANUFACTURING METHOD THEREOF

(75) Inventors: Weitao Chen, Beijing (CN); Dongsheng Huang, Beijing (CN); Kai Zhao, Beijing (CN)

(73) Assignee: Beijing Boe Optoelectronics Technology Co., Ltd., Beijing (CN)

( * ) Notice: Subject to any disclaimer, the term of this patent is extended or adjusted under 35 U.S.C. 154(b) by 375 days.

(21) Appl. No.: 12/718,425

(22) Filed: Mar. 5, 2010

(65) Prior Publication Data

US 2010/0225872 A1 Sep. 9, 2010

(30) Foreign Application Priority Data

Mar. 6, 2009 (CN) .......................... 2009 1 0079709

(51) Int. Cl.
*G02F 1/1339* (2006.01)
(52) U.S. Cl.
USPC .......................................... 349/153; 349/190
(58) Field of Classification Search
None
See application file for complete search history.

(56) References Cited

U.S. PATENT DOCUMENTS

| 2003/0112405 | A1* | 6/2003 | Kim et al. ..................... 349/156 |
| 2003/0179338 | A1* | 9/2003 | Kim .............................. 349/153 |
| 2006/0285055 | A1* | 12/2006 | Tanaka .......................... 349/153 |
| 2007/0070288 | A1 | 3/2007 | Eun et al. |
| 2007/0297076 | A1* | 12/2007 | Kim et al. ..................... 359/894 |
| 2011/0013125 | A1* | 1/2011 | Lee et al. ...................... 349/106 |

FOREIGN PATENT DOCUMENTS

| CN | 1940656 A | 4/2007 |
| CN | 101320173 A | 12/2008 |
| EP | 1129124 A1 | 9/2001 |
| KR | 2003-0076873 A | 9/2003 |
| KR | 2007-0122082 A | 12/2007 |
| KR | 2008-0046432 A | 5/2008 |

\* cited by examiner

*Primary Examiner* — Thanh-Nhan P Nguyen
(74) *Attorney, Agent, or Firm* — Ladas & Parry LLP (57) ABSTRACT

A liquid crystal display panel and a manufacturing method thereof. The liquid crystal display panel comprises a color filter substrate and an array substrate which are assembled together with a sealant, and an accommodating space for accommodating liquid crystal is formed between the sealant and an edge of an effective display region that is formed between the color filter substrate and the array substrate.

13 Claims, 5 Drawing Sheets

Figure 11

LIQUID CRYSTAL DISPLAY PANEL AND MANUFACTURING METHOD THEREOF

BACKGROUND

The invention relates to a liquid crystal display panel and a manufacturing method thereof.

Among flat panel displays, thin film transistor liquid crystal displays (TFT-LCDs) have advantages of low energy consumption, low manufacturing cost, low radiation, and etc., and thus prevail in the flat panel display market. During the manufacturing of a liquid crystal display, defects such as gravity Mura (luminance nonuniformity), periphery Mura and the like are generated due to excessive liquid crystal filed in the display region, or other defects such as low-temperature bubble and the like are generated due to insufficient liquid crystal filed in the display region. In this case, the display quality of the liquid crystal display panel can be adversely influenced.

Figure 1:
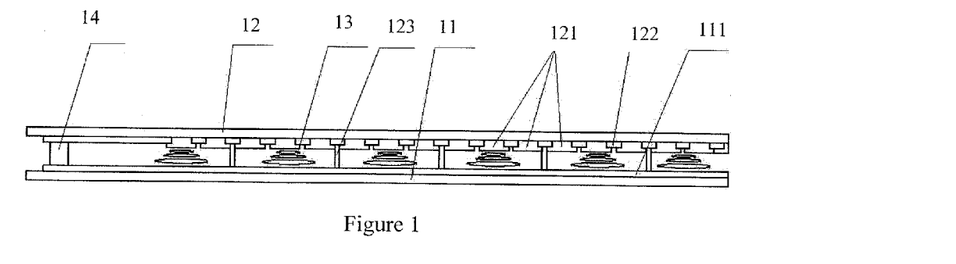
FIG. 1 is schematic view showing a conventional liquid crystal display panel.

As shown in FIG. 1, a TFT-LCD comprises an array substrate 11, a color filter substrate 12 and a liquid crystal layer 13. The liquid crystal layer 13 is filled and interposed between the array substrate 11 and the color filter substrate 12, and spacers 123 are provided, for example, on the color filter substrate 12 to maintain the thickness of the formed liquid crystal cell. The array substrate 11 and the color filter substrate 12 are sealed by a sealant 14 at the peripheral regions.

Typically, in manufacturing a liquid crystal display, a cell process (i.e. a process to assemble an array substrate and a color filter substrate together) is performed after the array substrate and the color filter substrate are manufactured. The cell process can comprise four steps as follows: applying and curing an orientation film on the array substrate and the color filter substrate; rubbing the cured orientation film to form grooves in a certain direction on the surface of the orientation film, so that the liquid crystal molecules can be pre-aligned along the direction; dropping liquid crystal, applying sealant, bonding the array substrate and the color filter substrate together and curing the sealant to form a liquid crystal cell; and, performing the cutting process, that is, the array substrate and the color filter substrate which have been assembled together are cut to form individual cells.

During the above-described cell process, the amount of the liquid crystal sealed in the each cell formed by the array substrate and the color filter substrate can not be increased or decreased after the sealant is cured, and the display quality of the liquid crystal display will be deteriorated if the amount of the liquid crystal sealed in the cell is excessive or insufficient. Therefore, it is desired that the liquid crystal of an appropriate amount required for effective display region is dropped into the cell to achieve an excellent display quality.

SUMMARY OF THE INVENTION

A liquid crystal display panel is provided in an embodiment of the invention. The liquid crystal display panel comprises a color filter substrate and an array substrate which are assembled with a sealant, and an accommodating space for accommodating liquid crystal is formed between the sealant and an edge of an effective display region that is formed between the color filter substrate and the array substrate.

A method of manufacturing a liquid crystal display panel is further provided in another embodiment of the invention. The method comprises the steps of: providing a color filter substrate and an array substrate; assembling the color filter substrate and the array substrate together by a sealant to form the liquid crystal display panel. An accommodating space for accommodating liquid crystal is formed between the sealant and an edge of an effective display region that is formed between the color filter substrate and the array substrate.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The present invention will become more fully understood from the detailed description given hereinafter and the accompanying drawings which are given by way of illustration only, and thus are not limitative of the present invention and wherein.

DESCRIPTION OF THE EMBODIMENTS

Hereinafter, a liquid crystal display panel and a method of manufacturing the liquid crystal display panel will be described in detail with reference to the accompanying drawings.

It should be understood that the embodiments described below are only a part of not all of, the embodiments of the invention. Based on the described embodiments, any other embodiments accomplished by those skilled in the art without inventive works are fallen within the scope of the invention also.

A liquid crystal display panel according to an embodiment of the invention comprises a color filter substrate and an array substrate which are assembled together with a sealant. An accommodating space for accommodating liquid crystal is formed between the sealant and an edge of an effective display region that is formed between the color filter substrate and the array substrate.

In the liquid crystal display panel according to the embodiment of the invention, the accommodating space for accommodating the liquid crystal is formed between the sealant and the edge of the effective display region, and the effective display region is formed between the color filter substrate and the array substrate. When the liquid crystal in the effective display region of the formed liquid crystal cell is excessive or insufficient, the amount of the liquid crystal in the effective display region can be adjusted accordingly by releasing the liquid crystal stored in the accommodating space into the effective display region or by flowing the excessive liquid crystal in the effective display region into the accommodating space. Furthermore, in the liquid crystal display panel according to the embodiment of the invention, the impurities contained in the sealant can be prevented from entering into the effective display region by the accommodating space, and thus the pollution to the liquid crystal from the impurities contained in the sealant can be avoided.

Figure 2:
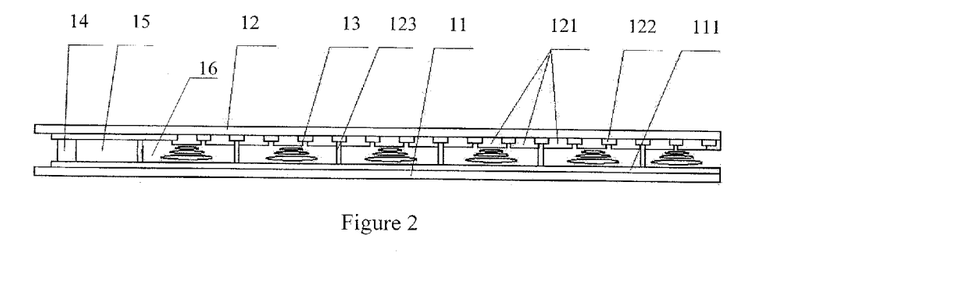
FIG. 2 is a schematic view showing a liquid crystal display panel according to an embodiment of the invention.

As shown in FIG. 2, the liquid crystal display panel according to an embodiment of the invention comprises a color filter substrate 12, an array substrate 11 and an accommodating space 15 for accommodating liquid crystal. The color filter substrate 12 and the array substrate 11 are assembled together with a sealant 14, and the accommodating space 15 is formed between the edge of an effective display region 16 and the sealant 14, and the effective display region 16 is positioned between the color filter substrate 12 and the array substrate 11. The effective display region 16 is formed in the central portion of the panel and for displaying images.

The array substrate 11 comprises an array circuit layer 11 on a substrate such as a glass substrate, and the color filter substrate 12 comprises resin color filter units 121, black matrixes 122 and spacers 123 on a substrate such as a glass substrate.

The accommodating space 15 can be formed in many manners. For example, the accommodating space 15 can be formed with a lateral protrusion formed on one of the substrates, or by both of the lateral protrusion and the sealant 14. The lateral protrusion may comprise a rectangular frame protrusion, an auxiliary protrusion, a grid protrusion, a strip protrusion or the like. These protrusions will be described in detail in the following embodiments.

The liquid crystal display panel according to the embodiment can be obtained in manufacturing different array substrates or color filter substrates and then performing an assembling process to produce a panel.

Hereinafter, the embodiments of the invention will be described in detail by using an array substrate or a color filter substrate, as an example, which can form a liquid crystal display panel by an assembling process.

An array substrate according to a first embodiment

An array substrate that can be used to form the liquid crystal display panel according to the first embodiment of the invention will be described.

Figure 3:
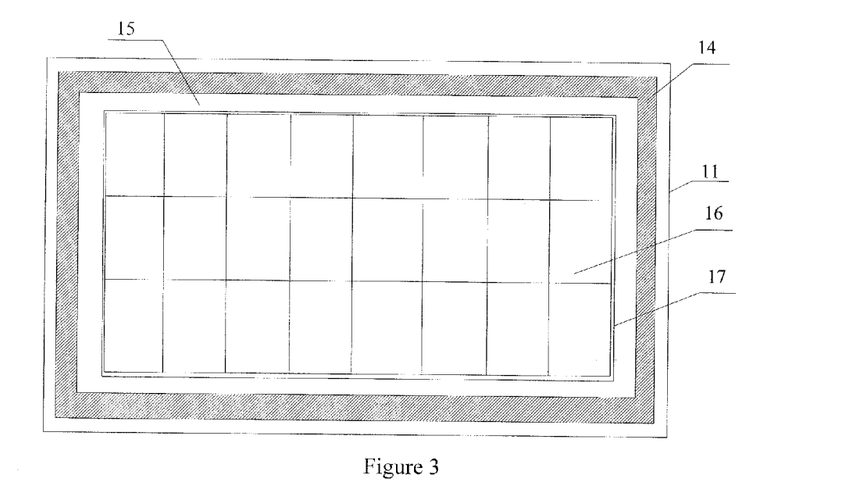
FIG. 3 is a schematic view showing an array substrate according to a first embodiment of the invention.

As shown in FIG. 3, the array substrate 11 according to the first embodiment comprises an array circuit layer on a substrate such as a glass substrate. The array circuit layer is not specifically indicated in the drawing for simplification. A rectangular frame protrusion 17 is formed along the edge of the effective display region 16 on the array substrate 11, and the rectangular frame protrusion 17 surrounds the effective display region 16. After the array substrate 11 is assembled together with a corresponding color filter substrate by means of a sealant 14, an accommodating space 15 is formed between the rectangular frame protrusion 17 and the sealant 14.

Typically, if liquid crystal is dropped on the array substrate 11, the sealant 14 can be applied on the color filter substrate. However, the sealant 14 is also shown in FIG. 3 in order to explain how the accommodating space 15 is formed by the rectangular frame protrusion 17 and the sealant 14. The height of the rectangular frame protrusion 17 may be equal to or slightly larger than (by about 1 μm) that of the spacer formed on the color filter substrate opposite to the array substrate 11.

The accommodating space 15 can be used to store liquid crystal therein. For example, liquid crystal is accommodated in a portion of, not all of, the accommodating space 15. The top portion of the rectangular frame protrusion 17 may have an arc shape, so that the tip end of arc shape is pressed when the array substrate and the color filter substrate are assembled together. In this way, it is facilitated to seal liquid crystal within the accommodating space 15.

When the liquid crystal amount in the effective display region 16 of the formed liquid crystal cell is excessive, the rectangular frame protrusion 17 can be partially cut off with a laser, and the excessive liquid crystal in the effective display region 16 can flow into the accommodating space 15; on the other hand, when the liquid crystal amount in the effective display region 16 of the cell is insufficient, the rectangular frame protrusion 17 can also be partially cut off with a laser, and the liquid crystal stored in the accommodating space 15 can flow into the effective display region 16.

Figure 4:
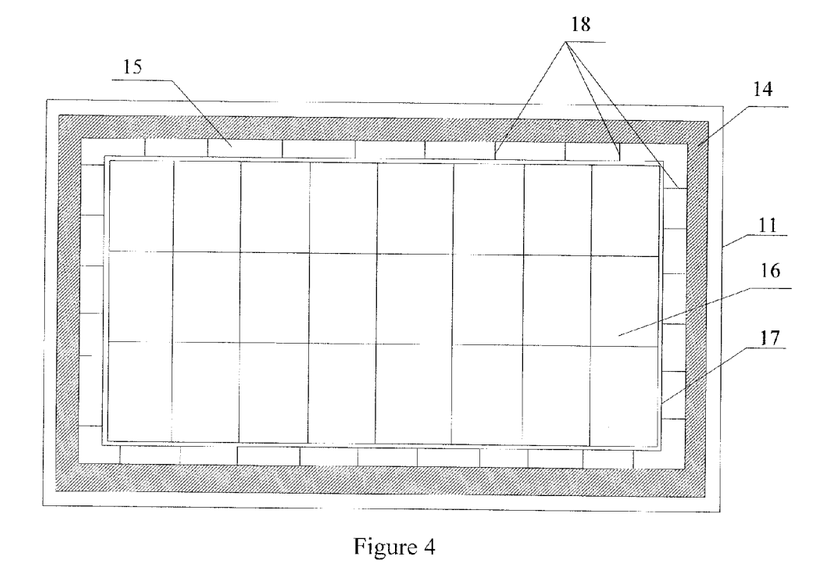
FIG. 4 is a schematic view showing another array substrate according to the first embodiment of the invention.

This embodiment can be amended further. As shown in FIG. 4, at least two auxiliary protrusions 18 are provided on the outer side of the rectangular frame protrusion 17. The auxiliary protrusions 18 are connected with the rectangular frame protrusion 17 and can have the same height as that of the rectangular frame protrusion 17. After the array substrate and the corresponding color filter substrate are assembled together, at least two accommodating spaces 15 are formed by the auxiliary protrusion 18, the rectangular frame protrusion 17 and the sealant 14. Thus, as shown in FIG. 4, a plurality of accommodating spaces 15 can be formed by a plurality of auxiliary protrusions 18, the rectangular frame protrusion 17 and the sealant 14.

Defects such as Mura are visible for eyes, and thus the defects at different positions can be repaired exactly by the accommodating space at the corresponding position. In addition, by forming the plurality of accommodating spaces, the liquid crystal amount in the effective display region can be adjusted more effectively. Some of the accommodating spaces 15 may be fully filled by liquid crystal, some of the accommodating spaces 15 may be partially filled by liquid crystal and some of the accommodating spaces 15 may not store liquid crystal therein at all. In this way, certain vacant space is remained in the accommodating spaces 15 as a whole. For example, the liquid crystal may be selectively stored alternatively among the accommodating spaces 15 so that the problems of excessive or insufficient liquid crystal can be solved more easily.

The rectangular frame protrusion 17 on the array substrate according to this embodiment may be formed by resin materials such as photoresist or by transparent conductive materials such as indium tin oxide (ITO). The configuration of the accommodating space formed in this embodiment is also applicable to those formed on the color filter substrate, and in this case, the structures such as the rectangular frame protrusion, the auxiliary protrusions and the like for forming the accommodating spaces may be formed by the same material as that for forming spacers on the color filter substrate. The structures of the accommodating space in the following embodiments may be formed by the above-described materials corresponding to the array substrate or the color filter substrate.

Figure 5:
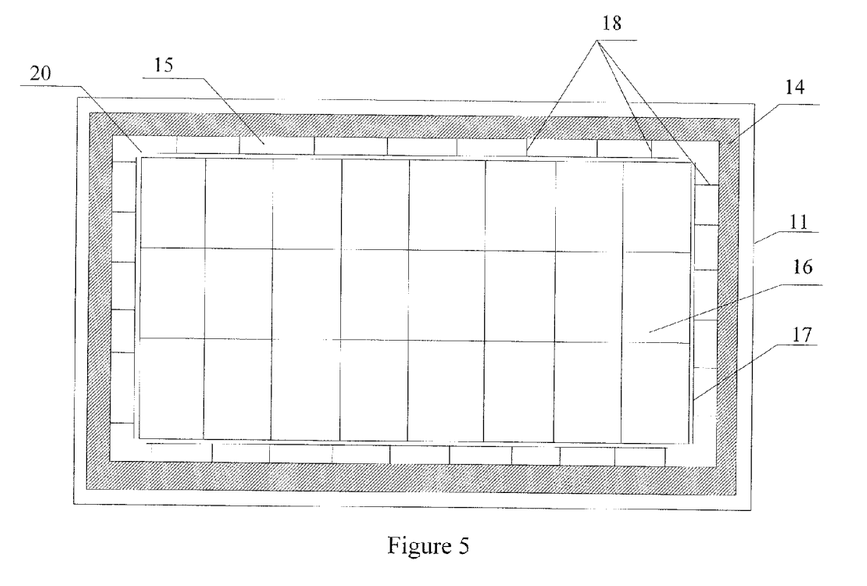
FIG. 5 is a schematic view showing still another array substrate according to the first embodiment of the invention.

Furthermore, in this embodiment, at least one opening 20 can be further provided on the rectangular frame protrusion 17, as shown in FIG. 5. The problem of excessive or insufficient liquid crystal in the effective display region 15 can also be solved by using the opening. With the liquid crystal display panel formed by the array substrate according to this embodiment, the impurities contained in the sealant can be prevented from entering into the effective display region by the accommodating space(s), and thus the pollution to the liquid crystal from the impurities contained in the sealant can be avoided.

A color filter substrate according to a second embodiment

A color filter substrate which can be used to form the liquid crystal display panel according to the embodiment of the invention will be described.

Figure 6:
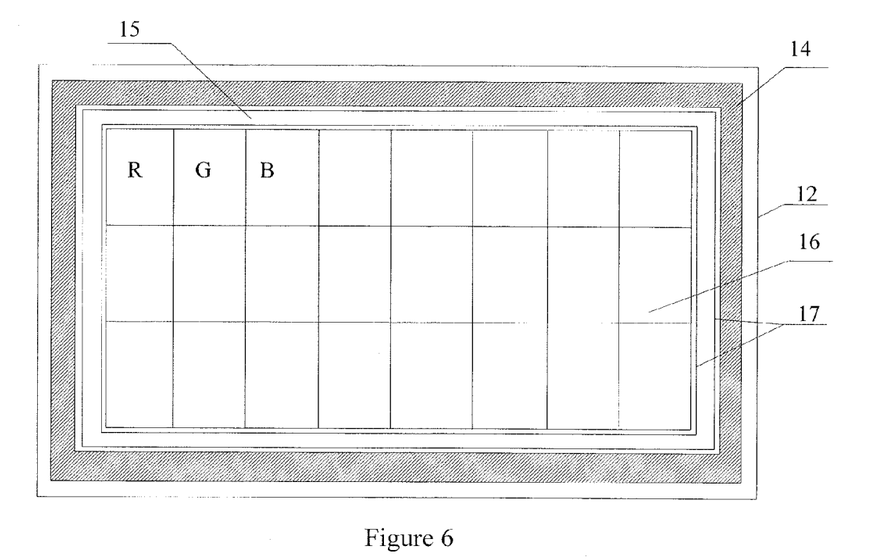
FIG. 6 is a schematic view showing a color filter substrate according to a second embodiment of the invention.

The color filter substrate 12 according to this embodiment is shown in FIG. 6 and can comprise black matrixes and color filter units on a substrate such as a glass substrate, and these components are not shown in the drawing for simplification. On the color filter substrate 12, two rectangular frame protrusions 17 are provide between the edge of an effective display region 16 and a sealant 14, and each of these two rectangular frame protrusions 17 surrounds the effective display region 16. An accommodating space 15 is formed by and between these two rectangular frame protrusions 17.

Figure 7:
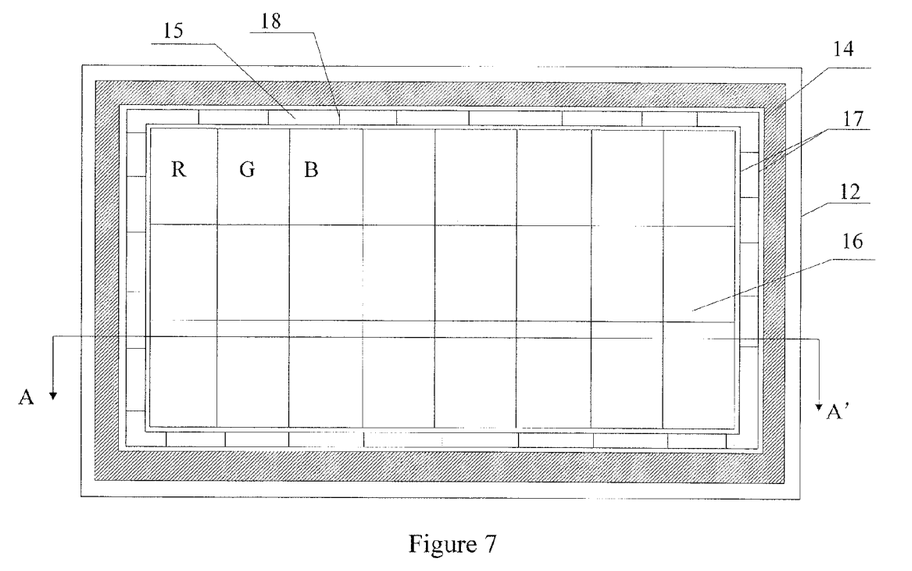
FIG. 7 is a schematic view showing another color filter substrate according to the second embodiment of the invention.
Figure 8:
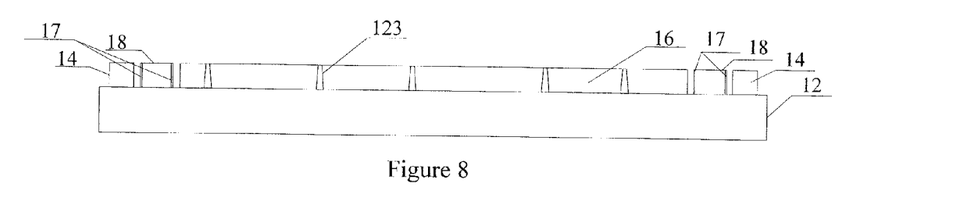
FIG. 8 is a sectional view taken along the line A-A' of FIG. 7.

As shown in FIG. 7, at least two auxiliary protrusions 18 can be further provided between these two rectangular frame protrusions 17 in order to facilitate the repairing of the liquid crystal display. A plurality of accommodating spaces 15 can formed by the auxiliary protrusions 18 and these two rectangular frame protrusions 17. FIG. 8 is a sectional view taken along the line A-A' of FIG. 7. As shown in FIG. 8, the heights of the rectangular frame protrusions 17 and the auxiliary protrusions 18 can be equal to or slightly larger than (by about 1 µm) that of spacers 123 formed on the color filter substrate 12. In addition, the top portion of the rectangular frame protrusion 17 may have an arc shape, so that the tip end of arc shape is pressed when the color filter substrate and the array substrate are assembled together. In this way, it is facilitated to seal the liquid crystal within the accommodating spaces 15.

The accommodating spaces 15 are used to store the liquid crystal. Specifically, some of the accommodating spaces 15 may be fully filled by liquid crystal, some of the accommodating spaces 15 may be partially filled by liquid crystal and some of the accommodating spaces 15 may not store liquid crystal therein at all. In this way, certain vacant space is remained in the accommodating spaces 15 as a whole, so that the problems of excessive or insufficient liquid crystal can be solved more easily.

If liquid crystal is dropped on the color filter substrate, the sealant 14 can be applied on the array substrate. However, the sealant 14 is also shown in FIG. 6 and FIG. 7 in order to show the position of the accommodating space (s). The following embodiments can have a similar case. The way to form the accommodating space in this embodiment is also applicable to the array substrate. With the liquid crystal display panel formed by the color filter substrate according to this embodiment, the impurities contained in the sealant can be prevented from entering into the effective display region by the accommodating space(s), and thus the pollution to the liquid crystal from the impurities contained in the sealant can be avoided.

A color filter substrate according to a third embodiment

A color filter substrate which can form the liquid crystal display panel according to the embodiment of the invention will also be described.

Figure 9:
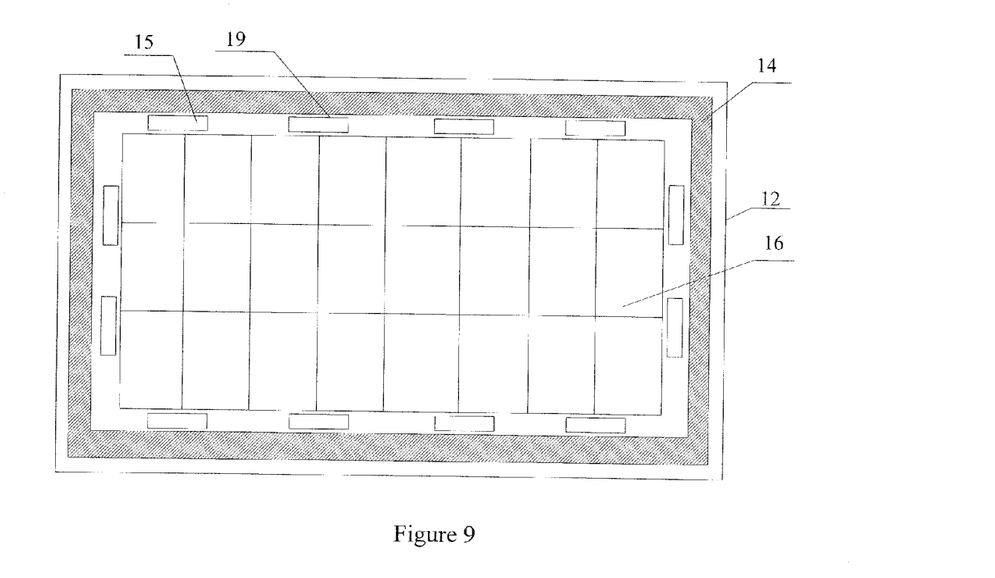
FIG. 9 is a schematic view showing a color filter substrate according to a third embodiment of the invention.

As shown in FIG. 9, on the color filter substrate 12 of this embodiment, at least two grid protrusions 19 are provided between the edge of an effective display region 16 and a sealant 14. The sides of each of the grid protrusions 19 are positioned on the same side of the effective display region 16. An accommodating space 15 is formed by each of the grid protrusions independently.

The grid protrusions 19 may be closely arranged along the edge of the effective display region 16, or a plurality of grid protrusions 19 may be dispersedly arranged along the edge of the effective display region 16. If adjacent grid protrusions 19 shown in FIG. 9 are closely arranged along the edge of the effective region 16, the shape of the second embodiment shown in FIG. 7 can be obtained.

As the first and the second embodiments have described, the accommodating spaces 15 are used to store liquid crystal. Specifically, some of the accommodating spaces 15 may be fully filled by liquid crystal, some of the accommodating spaces 15 may be partially filled by liquid crystal and some of the accommodating spaces 15 may not store liquid crystal therein at all. In this way, certain vacant space is remained in the accommodating spaces 15 as a whole. In a similar way to the first embodiment, if the liquid crystal amount in the effective region 16 is excessive or insufficient after the array substrate and the color filter substrate are assembled together, the liquid crystal amount in the effective display region 16 can be adjusted accordingly by the complement of liquid crystal between the effective display region 16 and the accommodating region 15.

This embodiment is also applicable to the array substrate.

A substrate of the liquid crystal display panel according to a fourth embodiment The invention is not limited to the first embodiment, the second embodiment and the third embodiment described above. A substrate of a different form is provided in this embodiment.

Figure 10:
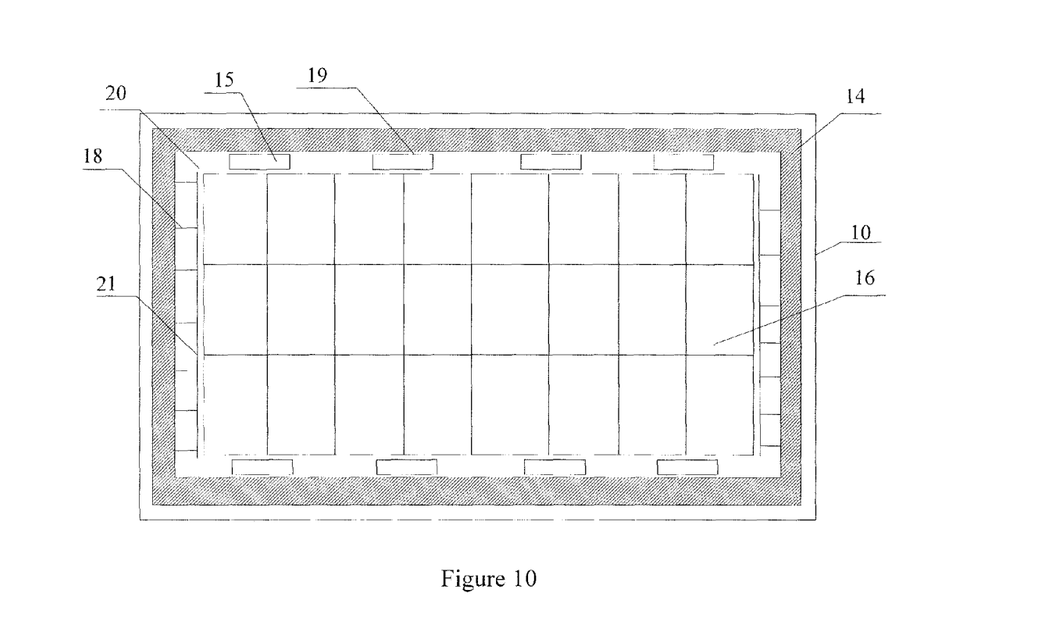
FIG. 10 is a schematic view showing a substrate according to a fourth embodiment of the invention.
Figure 11:
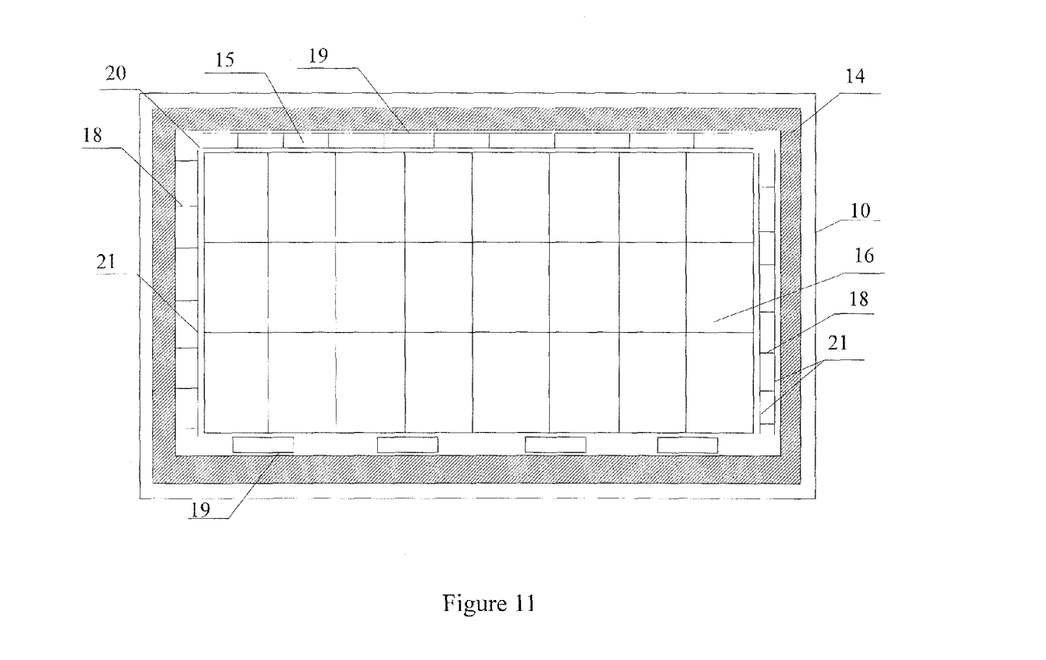
FIG. 11 is a schematic view showing an alternative substrate according to the fourth embodiment of the invention.

As shown in FIG. 10, on the substrate 10 (an array substrate 11 or a color filter substrate 12) according to this embodiment, a strip protrusion 21 is provided along the left and right edges of an effective display region 16, respectively. A plurality of auxiliary protrusions 18 are provided on the outer side of the strip protrusion 21 (i.e., on the side of the strip protrusion 21 facing the sealant 14). Accommodating spaces 15 are formed by the auxiliary protrusions 18, the strip protrusions 21 and the sealant 14 after the array substrate and the color filter substrate are assembled together.

The invention is not limited to the above configuration, and the accommodating space 15 may be formed in other manners and positioned on each side of effective display region of the same substrate. In addition, any combination of the accommodating spaces which are formed in different manners may be adopted. The manners to form the accommodating spaces in the above embodiments may be combined in the same substrate to embody the different embodiments. The embodiments obtained by combinations and modifications are all within the scope of the invention. For example, the accommodating spaces on the right side, left side, upper side and the lower side may be formed in different manners.

As the embodiments described above, the accommodating spaces 15 can be used to store liquid crystal. Specifically, some of the accommodating spaces 15 may be fully filled by liquid crystal, some of the accommodating spaces 15 may be partially filled by liquid crystal and some of the accommodating spaces 15 may not store liquid crystal therein at all. In a similar way with the first embodiment, if the liquid crystal amount in the effective region 16 is excessive or insufficient after the array substrate and the color filter substrate are assembled together, the liquid crystal amount in the effective display region 16 can be adjusted accordingly by the flow of liquid crystal between the effective display region 16 and the accommodating region 15.

This embodiment may be applicable to a color filter substrate or an array substrate.

In addition, with the array substrate or the color filter substrate according to this embodiment, the impurities contained in the sealant can be prevented from entering into the effective display region by the accommodating space(s), and thus the pollution to the liquid crystal from the impurities contained in the sealant can be avoided.

A method of manufacturing a liquid crystal display panel is also provided in an embodiment of the invention. With the liquid crystal display panel manufactured by the method, the liquid crystal amount in the effective display region can be adjusted after the array substrate and the color filter substrate are assembled together.

The method of manufacturing the liquid crystal display panel according to the embodiment of the invention may comprise the steps of: providing a color filter substrate and an array substrate; assembling the color filter substrate and the array substrate together by a sealant to form a liquid crystal display panel; during forming the array substrate or the color filter substrate, an accommodating space is formed by a patterning process between the edge of the effective display region in the array substrate or the color filter substrate and the sealant to be formed subsequently.

In the method of manufacturing the liquid crystal display panel according to the embodiment of the invention, during forming the array substrate or the color filter substrate, the accommodating space for accommodating the liquid crystal is formed by a patterning process between the edge of the effective display region of the array substrate or the color filter substrate and the sealant to be formed subsequently, and thus a partially-sealed or a fully-sealed container can be formed by the accommodating space after the array substrate and the color filter substrate are assembled together and the formed a container is used to store liquid crystal. In this way, when the liquid crystal in the effective display region of the liquid crystal cell is excessive or insufficient, the amount of the liquid crystal in the effective display region can be adjusted accordingly by releasing the liquid crystal stored in the accommodating space into the effective display region or by flowing the excessive liquid crystal in the effective display region into the accommodating space.

In particular, the accommodating space is formed by the structure for the accommodating space on the array substrate or the color filter substrate, then the array substrate and the color filter substrate are assembled together to form the liquid crystal display panel, and thus the embodiment of the invention is implemented.

A method of manufacturing a liquid crystal display panel according to a first example In this example, the structure for an accommodating space is formed on a color filter substrate.

This example may comprise the following steps.

S121 of forming the patterns of a black matrix layer, a pixel resin layer and a common electrode layer on a glass substrate.

This step can be performed by applying a film, patterning and the like in the existing process or developing process, which is not described in detail here for simplification.

S122 of applying a resin layer on the glass substrate.

The resin layer is used as the material to form spacers.

In the following steps S123~S125, spacers and an accommodating space on the color filter substrate are formed by a patterning process. Typically, the patterning process may comprise applying a photoresist, exposing and developing the photoresist, etching with the pattern formed by the photoresist as a mask, lifting-off the remained photoresist and the like.

S123 of applying a photoresist layer on the resin layer.

For example, positive type photoresist is used in this example.

Step 124 of blocking the positions where spacers to be formed and the position where a lateral protrusion for an accommodating space to be formed with a mask and exposing.

That is, the positions to be exposed with the mask are not the position where the spacers to be formed or the position where the lateral protrusion for the accommodating space to be formed.

S125 of developing and etching to form the patterns of the spacers and the lateral protrusion for the accommodating space.

The embodiment is not limited to this, and the color filter substrate with the accommodating space of different structure may be formed with reference to the embodiments of the liquid crystal display panel described above. The height of the lateral protrusion formed by the above method may be equal to that of the spacer in the liquid crystal display panel; however the height of the lateral protrusion formed by a different method may be slightly larger than that of the spacer (by about 1 μm).

In addition, the accommodating space may be formed independently. For example, the accommodating space may be formed in an independent process before or after the spacer is formed.

S126 of dropping the liquid crystal into an effective display region of the substrate and the accommodating space.

Specifically, a plurality of accommodating spaces can be formed also, and each accommodating space may be fully or partially filled by liquid crystal or not store liquid crystal therein at all, and thus certain vacant space is remained in the accommodating space as a whole. For example, liquid crystal may be selectively stored alternatively among accommodating spaces depending on the practical requirements.

The color filter substrate is obtained by the above steps.

S127 of forming an array substrate by a patterning process.

A sealant is applied at the corresponding position on the array substrate.

S128 of assembling the array substrate and the color filter substrate together to form a liquid crystal display panel.

In this example, the spacers and the structure for the accommodating space are formed simultaneously; however, in other examples, the structure for the accommodating space may be formed before or after the spacers are formed. The manner to form the accommodating space in this embodiment is applicable to form the accommodating space in the manufacturing process of the array substrate, and in this case, the lateral protrusion for the accommodating space on the array substrate may be formed with a transparent conductive material or a photoresist.

A method of manufacturing a liquid crystal display panel according to a second example In this example, the structure for the accommodating space is formed on the array substrate.

This embodiment may comprise the following steps.

S131 of forming layers of an array circuit layer on a glass substrate.

In this step, gate electrodes, source electrodes and drain electrodes of an array circuit layer may be formed by an existing or developing process, which is not described in detail here.

S132 of depositing a transparent conductive film on the glass substrate.

S133 of blocking the positions where spacers to be formed and the position where a lateral protrusion for an accommodating space to be formed with a mask and exposing.

S134 of developing and etching the exposed transparent conductive film to form the patterns of pixel electrodes and the lateral protrusion for the accommodating space.

S135 of dropping liquid crystal into an effective display region of the substrate and the accommodating space.

Specifically, a plurality of accommodating spaces can be formed also, and each accommodating space may be fully or partially filled by liquid crystal, or not store liquid crystal therein at all, and thus certain vacant space is remained in the accommodating space as a whole. For example, the liquid crystal may be selectively stored alternatively among accommodating spaces depending on the practical requirements.

S136 of forming a color filter substrate by patterning process.

A sealant is applied at the corresponding position on the color filter substrate.

S137 of assembling the array substrate and the color filter substrate together to form a liquid crystal display panel.

The example is not limited to this, and the accommodating space may be formed before or after the pixel electrode is formed. The structure for the accommodating space may be formed by photoresist. If the structure for the accommodating space is formed by photoresist, only development is performed after exposing the position where the accommodating space to be formed so as to form the accommodating space.

The manner to form the accommodating space in this example is also applicable to form the accommodating space during the manufacturing process of the color filter substrate, and in this case, the lateral protrusion for the accommodating space on the color filter substrate is usually formed by resin. The lateral protrusion in this embodiment may comprise the rectangular frame protrusion, the auxiliary protrusion, the grid protrusion or the strip protrusion described above.

The method of the manufacturing the liquid crystal display panel is not limited to the above, and the manufacture of the array substrate or the color filter substrate may refer to the structure for the accommodating space described in the above embodiments of the liquid crystal display panel.

With the method of manufacturing the liquid crystal display panel according to the invention, the accommodating space for accommodating the liquid crystal can be formed in the manufacturing process of the array substrate or the color filter substrate, and an additional process is not needed. In addition, the impurities contained in the sealant can be prevented from entering into the effective display region by the accommodating space(s), and thus the pollution to the liquid crystal from the impurities contained in the sealant can be avoided.

It should be appreciated that the embodiments described above are intended to illustrate but not limit the present invention. Although the present invention has been described in detail herein with reference to the preferred embodiments, it should be understood by those skilled in the art that the present invention can be modified and some of the technical features can be equivalently substituted without departing from the spirit and scope of the present invention.

What is claimed is:

1. A liquid crystal display panel comprising a color filter substrate and an array substrate which are assembled together with a sealant,
wherein an accommodating space for accommodating liquid crystal is formed between the sealant and an edge of an effective display region that is formed between the color filter substrate and the array substrate,
wherein the accommodating space is partially filled with liquid crystal and leaves a vacant part, and the liquid crystal is sealed in the accommodating space,
wherein the accommodating space is formed by two rectangular frame protrusions formed along the edge of the effective display region of the color filter substrate or the array substrate,
wherein a plurality of auxiliary protrusions connected with the two rectangular frame protrusions are provided between the two rectangular frame protrusions and divide the accommodating space into a plurality of accommodating chambers, and
wherein the plurality of accommodating chambers are selectively and alternatively filled with the liquid crystal.

2. The liquid crystal display panel according to claim 1, wherein
a height of the rectangular frame protrusion is equal to or larger than that of spacers in the liquid crystal display panel.

3. The liquid crystal display panel according to claim 1, wherein
a height of the auxiliary protrusions is equal to or larger than that of the spacers in the liquid crystal display panel.

4. The liquid crystal display panel according to claim 1, wherein the protrusions formed on the color filter substrate is formed by resin.

5. The liquid crystal display panel according to claim 1, wherein the protrusions formed on the array substrate is formed by a photoresist or a transparent conductive material.

6. The liquid crystal display panel according to claim 1, wherein a top portion of the protrusions formed on the color filter substrate or the array substrate has an arc shape.

7. The liquid crystal display panel according to claim 1, wherein when liquid crystal amount in the effective display region is excessive, the protrusion is partially cut off, and the excessive liquid crystal in the effective display region flows into the accommodating space; when the liquid crystal amount in the effective display region is insufficient, the protrusion is partially cut off, and the liquid crystal stored in the accommodating space flows into the effective display region.

8. A method of manufacturing a liquid crystal display panel, comprising the steps of:
providing a color filter substrate and an array substrate; and
assembling the color filter substrate and the array substrate together by a sealant to form the liquid crystal display panel;
wherein an accommodating space for accommodating liquid crystal is formed between the sealant and an edge of an effective display region that is formed between the color filter substrate and the array substrate,
wherein the accommodating space is partially filled with liquid crystal and leaves a vacant part, and the liquid crystal is sealed in the accommodating space, and
wherein the accommodating space is formed by two rectangular frame protrusions formed along the edge of the effective display region of the color filter substrate or the array substrate,
wherein a plurality of auxiliary protrusions connected with the two rectangular frame protrusions are provided between the two rectangular frame protrusions and divide the accommodating space into a plurality of accommodating chambers, and
wherein the plurality of accommodating chambers are selectively and alternatively filled with the liquid crystal.

9. The method of manufacturing the liquid crystal display panel according to claim 8, wherein the accommodating space is formed together with spacers during forming the color filter substrate.

10. The method of manufacturing the liquid crystal display panel according to claim 9, wherein the step of forming the accommodating space together with the spacers comprises:
   applying a resin layer on a substrate; and
   forming the patterns of the accommodating space and spacers by the patterning process.

11. The method of manufacturing the liquid crystal display panel according to claim 8, wherein the accommodating space is formed together with a pixel electrode during forming the array substrate.

12. The method of manufacturing the liquid crystal display panel according to claim 11, wherein the step of forming the accommodating space together with the pixel electrode comprises:
   depositing a transparent conductive film on a substrate; and
   forming the patterns of the accommodating space and the pixel electrode by the patterning process.

13. The method of manufacturing the liquid crystal display panel according to claim 8, wherein the step of forming the accommodating space during forming the array substrate comprises:
   applying a photoresist on a substrate; and
   forming the patterns of the accommodating space by exposing and developing.

* * * * *